United States Patent [19]
Song

[11] Patent Number: 5,644,779
[45] Date of Patent: Jul. 1, 1997

[54] PROCESSING SYSTEM AND METHOD OF OPERATION FOR CONCURRENT PROCESSING OF BRANCH INSTRUCTIONS WITH CANCELLING OF PROCESSING OF A BRANCH INSTRUCTION

[75] Inventor: Seungyoon Peter Song, Austin, Tex.

[73] Assignee: International Business Machines Corporation, Armonk, N.Y.

[21] Appl. No.: 228,249

[22] Filed: Apr. 15, 1994

[51] Int. Cl.[6] .................................................. G06F 9/38
[52] U.S. Cl. ...................... 395/800; 364/231.8; 364/263; 364/261.3; 364/DIG. 1; 395/376
[58] Field of Search ...................................... 395/375, 800

[56] References Cited

U.S. PATENT DOCUMENTS

| | | |
|---|---|---|
| 4,827,402 | 5/1989 | Wada ........................... 395/375 |
| 4,991,080 | 2/1991 | Emma .......................... 395/375 |
| 5,051,940 | 9/1991 | Vassiliadis et al. ............. 364/736 |
| 5,072,364 | 12/1991 | Jardine ......................... 395/375 |
| 5,077,692 | 12/1991 | McMinn .................. 365/230.06 |
| 5,127,091 | 6/1992 | Boufarah ....................... 395/375 |
| 5,129,067 | 7/1992 | Johnson ........................ 395/375 |
| 5,136,697 | 8/1992 | Johnson ........................ 395/375 |
| 5,177,701 | 1/1993 | Iwasa ........................... 364/736 |
| 5,197,135 | 3/1993 | Eickemeyer et al. ........... 395/375 |
| 5,197,137 | 3/1993 | Kumar .......................... 395/800 |
| 5,202,889 | 4/1993 | Aharon et al. ................. 371/27 |
| 5,214,763 | 5/1993 | Blaner et al. .................. 395/375 |
| 5,222,244 | 6/1993 | Carbine et al. ................ 395/800 |
| 5,257,214 | 10/1993 | Mason et al. ................ 364/736.5 |
| 5,257,216 | 10/1993 | Sweedler ....................... 364/748 |
| 5,261,066 | 11/1993 | Jouppi et al. .................. 395/425 |
| 5,268,855 | 12/1993 | Mason et al. .................. 364/748 |
| 5,274,818 | 12/1993 | Vasilevsky et al. ............ 395/700 |
| 5,287,467 | 2/1994 | Blaner .......................... 395/375 |
| 5,347,639 | 9/1994 | Rechtschaffen ................ 395/375 |
| 5,353,419 | 10/1994 | Touch ........................... 395/375 |
| 5,446,850 | 8/1995 | Jeremiah ....................... 395/375 |
| 5,463,745 | 10/1995 | Vidwans ....................... 395/375 |

OTHER PUBLICATIONS

*IEEE Transactions on Computers*, vol. 39, No. 3, Mar. 1990, "Instruction Issue Logic for High–Perfomance, Interruptible, Multiple Functional Unit, Pipelined Computers" to G. S. Sohi, pp. 349–359.

*Primary Examiner*—Eric Coleman
*Attorney, Agent, or Firm*—Michael A. Davis, Jr.

[57] ABSTRACT

A processing system and method of operation are provided. In response to multiple branch instructions, an instruction is processed prior to execution of the branch instructions. In response to execution of any of the branch instructions, the processing of the instruction is cancelled prior to completion of the executed branch instruction.

20 Claims, 9 Drawing Sheets

| BUFFER NUMBER | INSTRUCTION TYPE EXECUTION UNIT | #GPR DEST. | #FPR DEST. | FINISHED | EXCEPTION |
|---|---|---|---|---|---|
| 0 | | | | | |
| 1 | 22 | 1 | 0 | 0 | 0 |
| 2 | 22 | 1 | 0 | 0 | 0 |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |

FIG. 5

| BUFFER NUMBER | REGISTER NUMBER | INFORMATION |
|---|---|---|
| 0 | | |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

FIG. 11

PROCESSING SYSTEM AND METHOD OF OPERATION FOR CONCURRENT PROCESSING OF BRANCH INSTRUCTIONS WITH CANCELLING OF PROCESSING OF A BRANCH INSTRUCTION

CROSS-REFERENCES TO RELATED APPLICATIONS

This patent application is related to copending U.S. patent application Ser. No. 08/497,001, entitled Processing System and Method of Operation, by Denman et al., filed concurrently herewith.

TECHNICAL FIELD

This patent application relates in general to systems for processing information and in particular to a processing system and method of operation.

BACKGROUND OF THE INVENTION

A superscalar processing system includes multiple execution units for simultaneously executing multiple instructions. Some processing systems support speculative branching. Accordingly, in response to a conditional branch instruction, the processing system speculatively branches its processing to a selected one of two or more possible target sequences of instructions before the processing system actually determines whether the selected sequence of instructions is in fact the correct sequence.

If the processing system later determines the speculative branch is correct, the processing system continues processing the selected sequence of instructions. By comparison, if the processing system later determines the branch is wrong, the processing system begins processing one or more correct instructions. According to typical previous techniques, in such a situation, the processing system delays processing a correct instruction even after determining the branch is wrong.

Thus, a need has arisen for a processing system and method of operation, in which, relative to typical previous techniques, the processing system reduces a delay in processing a correct instruction after determining a branch is wrong.

SUMMARY OF THE INVENTION

In a processing system and method of operation, an instruction is processed in response to multiple branch instructions prior to execution of the branch instructions. In response to execution of any of the branch instructions, the processing of the instruction is cancelled prior to completion of the executed branch instruction.

It is a technical advantage of the present invention that, relative to typical previous techniques, the processing system reduces a delay in processing a correct instruction after determining a branch is wrong.

BRIEF DESCRIPTION OF THE DRAWINGS

An exemplary embodiment of the present invention and its advantages are better understood by referring to the following descriptions and accompanying drawings, in which.

DETAILED DESCRIPTION

An exemplary embodiment of the present invention and its advantages are better understood by referring to FIGS. 1–11 of the drawings, like numerals being used for like and corresponding parts of the accompanying drawings.

Figure 1:
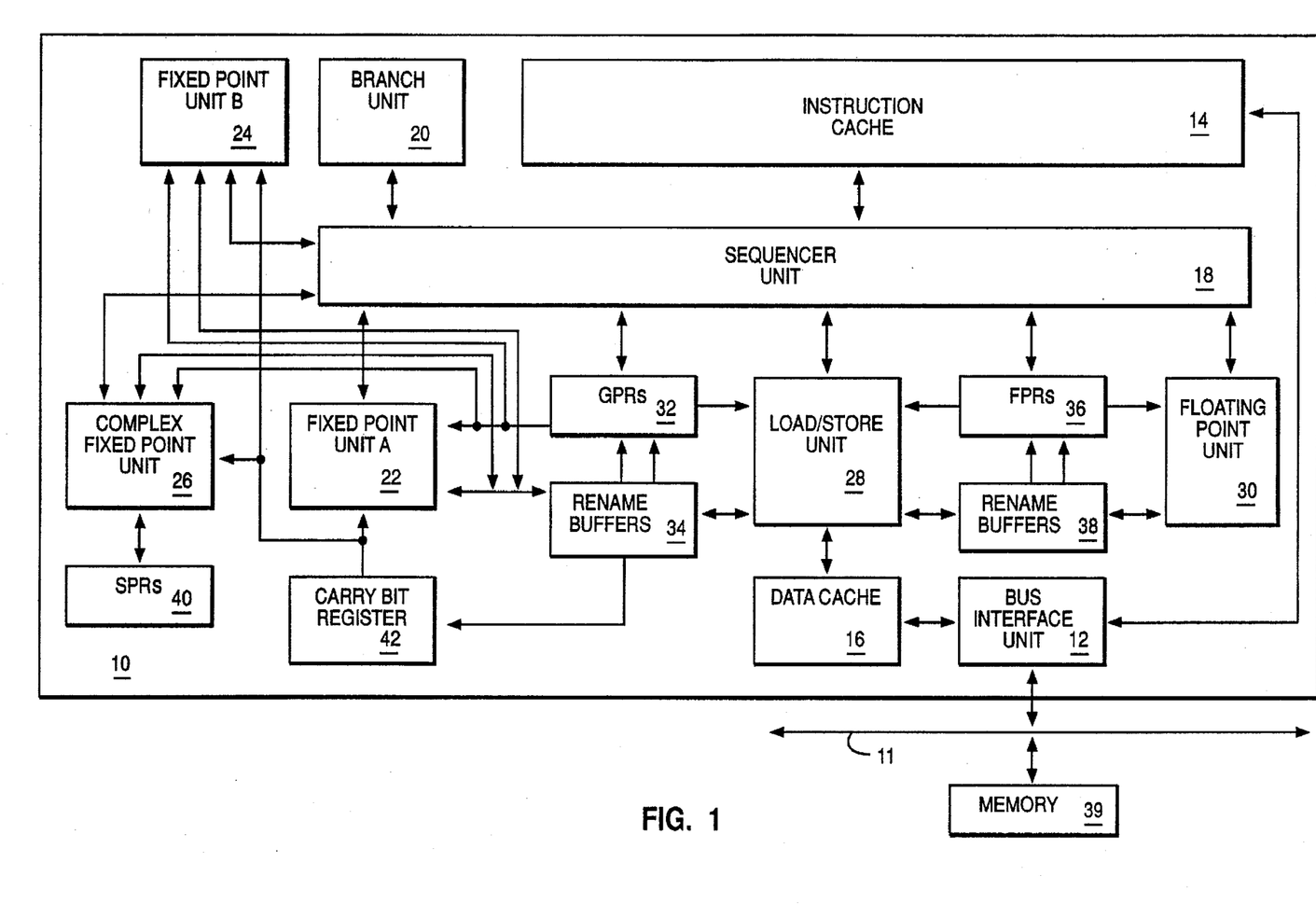
FIG. 1 is a block diagram of a processor for processing information according to the preferred embodiment.

FIG. 1 is a block diagram of a processor 10 system for processing information according to the preferred embodiment. In the preferred embodiment, processor 10 is a single integrated circuit superscalar microprocessor. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving rename buffer entries for the dispatched instructions results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Figure 2:
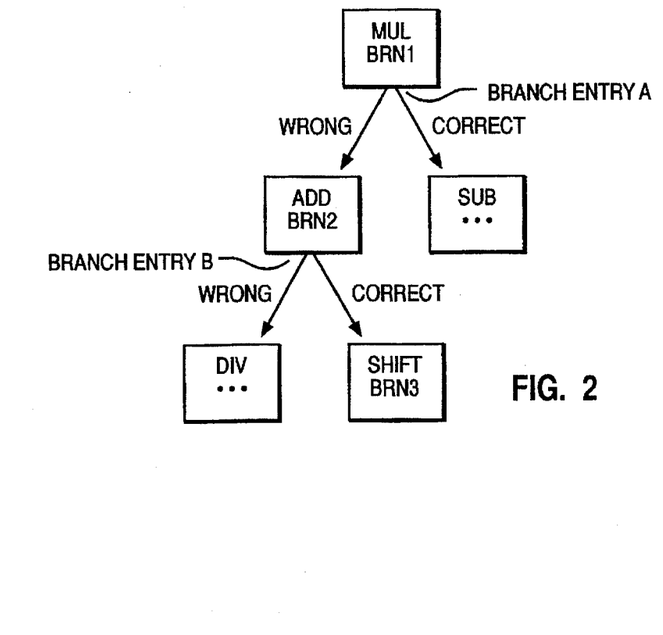
FIG. 2 is a conceptual illustration of exemplary instructions assigned to basic blocks of the preferred embodiment.
Figure 3:
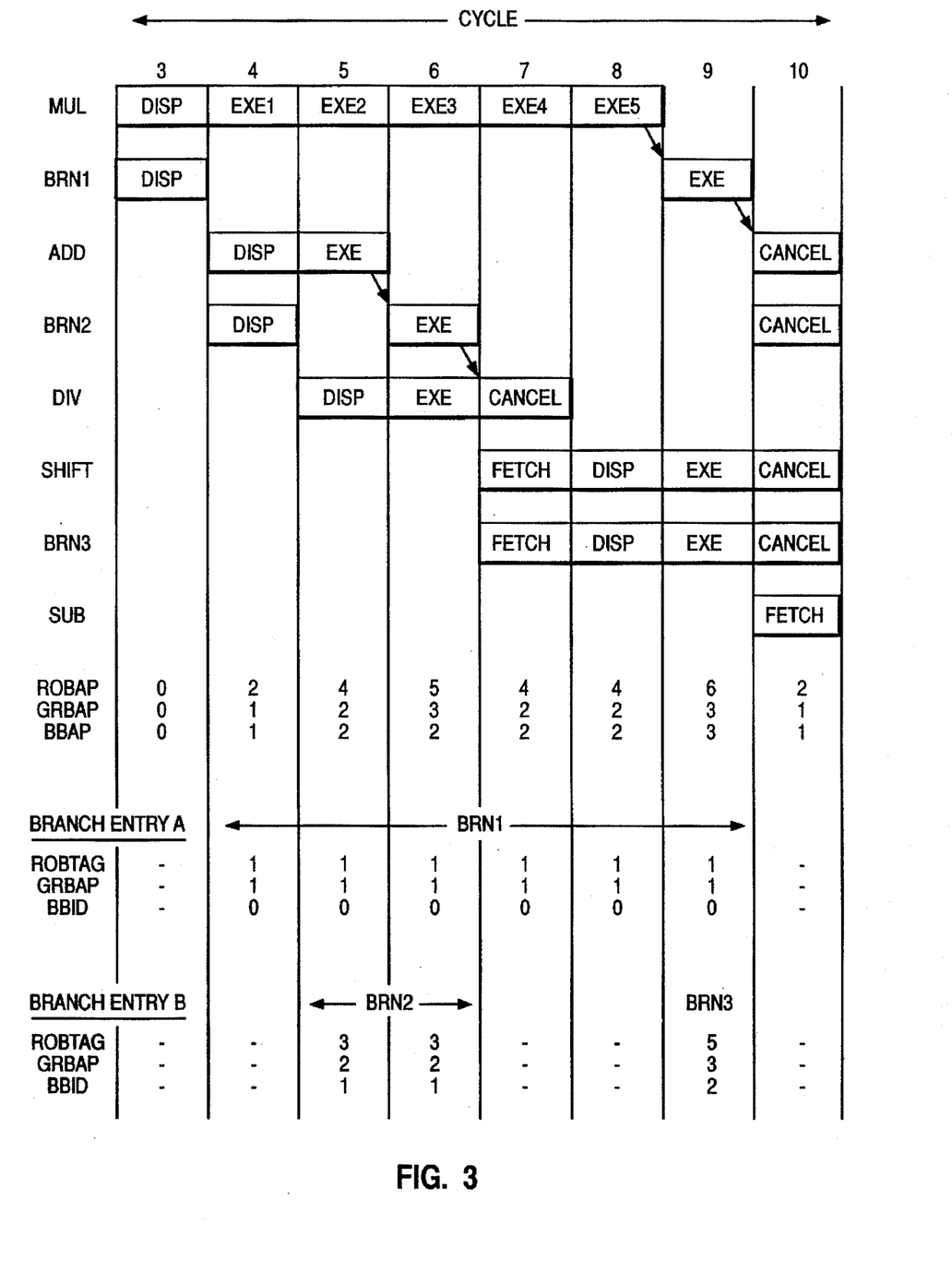
FIG. 3 is a conceptual illustration of the various stages of the instructions of FIG. 2 processed by the processor of FIG. 1.

FIG. 2 is a conceptual illustration of exemplary instructions assigned to basic blocks of the preferred embodiment. FIG. 3 is a conceptual illustration of the various stages of the instructions of FIG. 2 processed by processor 10. Significantly, processor 10 supports speculative branching.

Accordingly, in response to a conditional branch instruction, processor 10 speculatively branches its processing to a selected one of two or more possible target sequences of instructions before processor 10 actually determines whether the selected sequence of instructions is in fact the correct sequence. Thus, processor 10 speculatively processes the selected sequence of instructions before processor 10 actually determines whether the selected sequence of instructions is in fact the correct sequence, and prior to branch unit 20 executing the conditional branch instruction. Processor 10 speculatively branches its processing to the selected sequence of instructions in response to processor 10 predicting a state of a branch condition of the conditional branch instruction. Processor 10 predicts the state if the branch condition is subject to results of preceding instructions that processor 10 has not yet finished executing.

After processor 10 finishes execution of such preceding instructions, processor 10 determines the actual state of the branch condition, and branch unit 20 executes the conditional branch instruction. If the actual state is the same as the predicted state, then the predicted state is correct. By comparison, if the actual state is different from the predicted state, then the predicted state is wrong.

If the predicted state is correct, then the selected sequence of instructions is the correct sequence, and processor 10 continues processing the selected sequence of instructions. By comparison, if the predicted state is wrong, then the selected sequence of instructions is not the correct sequence. In such a situation where the predicted state is wrong, processor 10 stops (or "cancels") processing the selected sequence of instructions, recovers from the misprediction by reversing effects of processing the selected sequence of instructions, end begins processing the correct sequence of instructions in response to the actual state of the branch condition.

As shown in the example of FIGS. 2 and 3, processor 10 assigns two instructions, namely a multiply ("MUL") instruction and a conditional branch-1 ("BRN1 ") instruction, to a basic block number ("BBID")=1. During a cycle 4, at a branch entry A, processor 10 speculatively branches its processing in response to BRN1, such that processor 10 branches its processing from BRN1 to an add ("ADD") instruction. Processor 10 assigns ADD and a conditional branch-2 ("BRN2") instruction to a BBID=2.

During a cycle 5, at a branch entry B, processor 10 speculatively branches its processing in response to BRN2, such that processor 10 speculatively branches its processing from BRN2 to a divide ("DIV") instruction, which processor 10 assigns to a BBID=3. Notably, processor 10 is able to speculatively branch its processing during cycle 5 in response to BRN2, even though processor 10 does not determine the actual state of the branch condition of BRN1 until a later cycle 9. Accordingly, in a significant aspect of the preferred embodiment, processor 10 is able to speculatively branch its processing in response to a branch instruction (e.g. BRN2), even if processor 10 does not determine the actual state of a preceding branch instruction's (e.g. BRN1) branch condition until a later moment. Thus, processor 10 is able to speculatively branch its processing in response to multiple branch instructions concurrently, prior to determining the actual states of any of the branch instructions' branch conditions.

During a cycle 6, processor 10 executes BRN2, such that processor 10 determines the actual state of BRN2's branch condition. In the example of FIGS. 2 and 3, the actual state of BRN2's branch condition is different from the predicted state, such that the predicted state is wrong. Since the predicted state is wrong, the selected sequence of instructions (i.e. the DIV instruction to which processor 10 speculatively branched its processing) is not correct. In response to determining the predicted state of BRN2's branch condition is wrong, during a cycle 7, processor 10 cancels ("CANCEL") processing the DIV instruction and recovers from the misprediction by reversing effects of processing the DIV instruction.

Accordingly, processor 10 advantageously is able to recover from mispredicting the state of a branch instruction's (e.g. BRN2) branch condition, even if processor 10 does not determine the actual state of a preceding branch instruction's (e.g. BRN1) branch condition until a later moment.

Also, during cycle 7, processor 10 begins processing the correct sequence of instructions in response to the actual state of BRN2's branch condition; more particularly, processor 10 fetches a shift ("SHIFT") instruction and a branch-3 ("BRN3") instruction. Processor 10 assigns the SHIFT and BRN3 instructions to BBID=3, such that processor 10 reuses BBID=3 inresponse to cancelling the DIV instruction (which was previously assigned to BBID=3). In an alternative embodiment, processor 10 would have prefetched the SHIFT and BRN3 instructions during cycle 4 in parallel with fetching the DIV instruction. In such an alternative embodiment, processor 10 would be dispatch the SHIFT and BRN3 instructions during cycle 7 (instead of cycle 8) so that the SHIFT and BRN3 instructions would be executed during cycle 8 (instead of cycle 9).

Accordingly, in a significant aspect of the preferred embodiment, processor 10 is able to immediately begin processing the correct sequence of instructions in response to the actual state of a branch condition being different from the predicted state. In order to begin processing the correct sequence of instructions, processor 10 does not need to finish execution of all instructions preceding the branch instruction. Thus, processor 10 does not need to "complete" the branch instruction in order to begin processing the correct sequence of instructions.

For example, in FIG. 3, the MUL instruction does not finish execution until a cycle 8. Nevertheless, processor 10 begins processing the SHIFT and BRN3 instructions during an earlier cycle 7 prior to finishing execution of the preceding MUL instruction. Significantly, although the MUL instruction and the DIV instruction are both dispatched to CFXU 26 during cycles 3 and 5, respectively, processor 10 is able to selectively cancel execution of the DIV instruction within CFXU 26 during cycle 7 without cancelling execution of the MUL instruction within CFXU 26. Likewise, processor 10 is able to immediately dispatch additional instructions to CFXU 26 in response to the actual state of a branch condition being different from the predicted state.

During a cycle 9, processor 10 executes BRN1, such that processor 10 determines the actual state of BRN1's branch condition. In the example of FIGS. 2 and 3, the actual state of BRN1's branch condition is different from the predicted state, such that the predicted state is wrong. Since the predicted state is wrong, the selected sequence of instructions (i.e. the ADD, BRN2, DIV, SHIFT and BRN3 instructions to which processor 10 speculatively branched its processing) is not correct. In response to determining the predicted state of BRN1's branch condition is wrong, during a cycle 10, processor 10 cancels ("CANCEL") processing the ADD, BRN2, SHIFT and BRN3 instructions (the DIV instruction was already cancelled during cycle 7) and recovers from the misprediction by reversing effects of processing the ADD, BRN2, SHIFT and BRN3 instructions.

Also, during cycle 10, processor 10 begins processing the correct sequence of instructions in response to the actual state of BRN1's branch conditions more particularly, processor 10 fetches a subtraction ("SUB") instruction. Processor 10 assigns the SUB instruction to BBID=2, such that processor 10 reuses BBID=2 in response to cancelling the ADD and BRN2 instructions (which were previously assigned to BBID =2).

Figure 4:
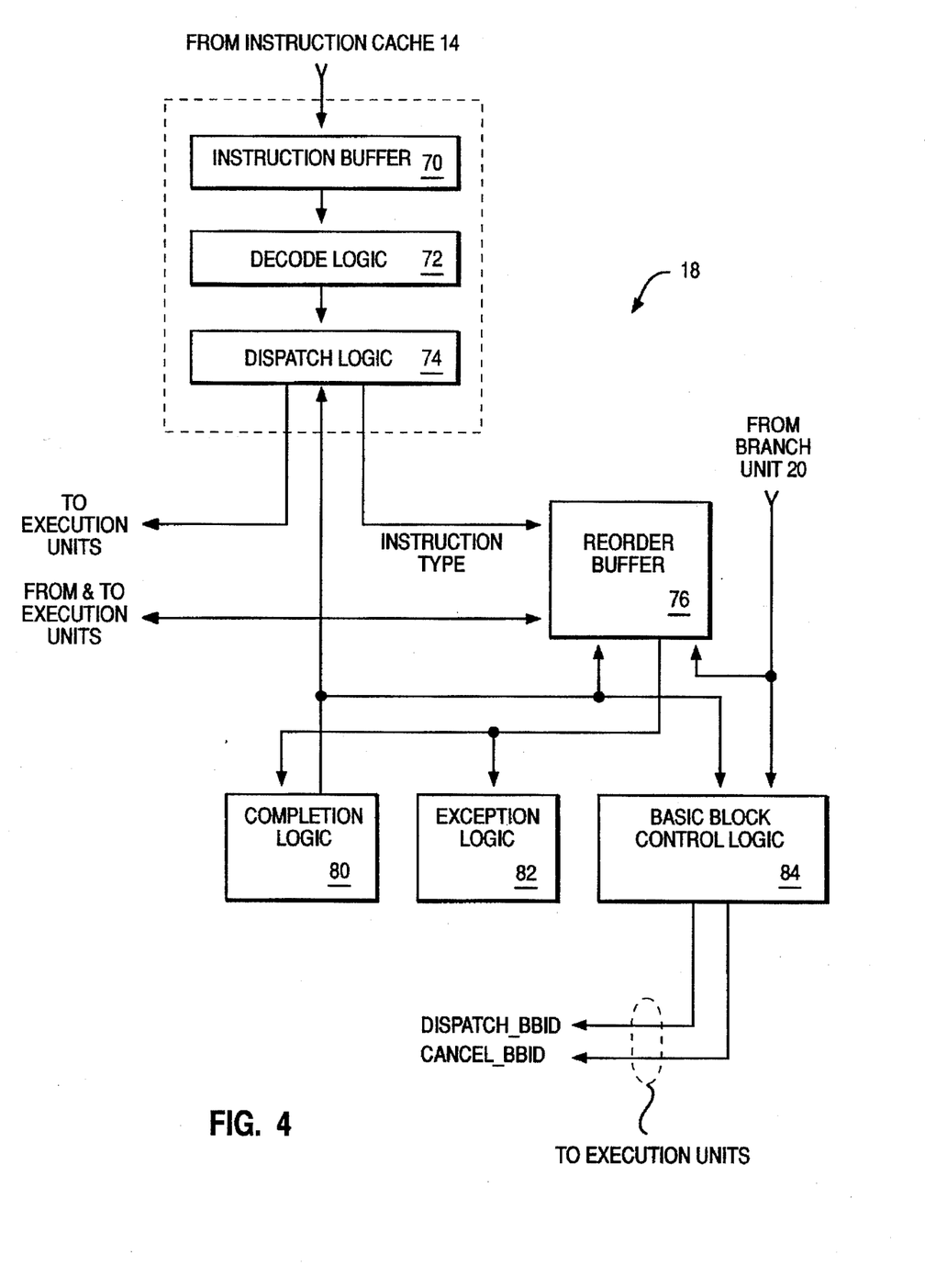
FIG. 4 is a block diagram of a sequencer unit of the processor of FIG. 1.

FIG. 4 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

Figure 5:
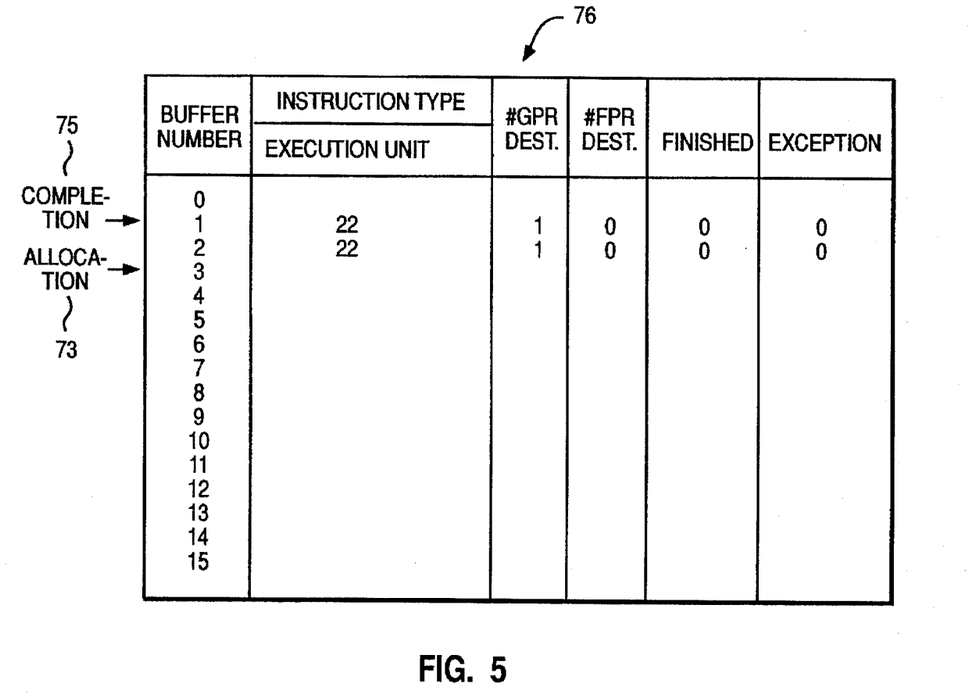
FIG. 5 is a conceptual illustration of a reorder buffer of the sequencer unit of FIG. 4.

FIG. 5 is a conceptual illustration of a reorder buffer 76 of sequencer unit 18 of the preferred embodiment. As shown in FIG. 5, reorder buffer 76 has sixteen entries respectively labelled as buffer numbers 0–15. Each entry has five primary fields, namely an "instruction type" field, a "number-of-GPR destinations" field, a "number-of-FPR destinations" field, a "finished" field, and an "exception" field.

Referring also to FIG. 4, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1–15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 1 of FIG. 5, reorder buffer 76 indicates the instruction is dispatched to FXUA 22. In other significant aspects of the preferred embodiment, entry 1 further indicates the dispatched instruction has one GPR destination register (such that "number-of-GPR destinations"=1), has zero FPR destination registers (such that "number-of-FPR destinations"=0), is not yet finished (such that "finished"=0), and has not yet caused an exception (such that "exception"=0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished"=1). If the execution unit encounters an exception during execution of the dispatched instruction, the execution unit modifies the entry's "exception" field (such that "exception"=1).

FIG. 5 shows an allocation pointer 73 and a completion pointer 75. Processor 10 maintains such pointers for controlling reading from and writing to reorder buffer 76. Processor 10 maintains allocation pointer 73 to indicate whether a reorder buffer entry is allocated to (or "associated with") a particular instruction. As shown in FIG. 5, allocation pointer 73 points to reorder buffer entry 3, thereby indicating that reorder buffer entry 3 is the next reorder buffer entry available for allocation to an instruction.

Also, processor 10 maintains completion pointer 75 to indicate (for a reorder buffer entry previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 5, completion pointer 75 points to reorder buffer entry 1, thereby indicating that reorder buffer entry 1 is the next reorder buffer entry capable of satisfying Conditions 1, 2 and 3. Accordingly, "valid" reorder buffer entries can be defined as the reorder buffer entry pointed to by completion pointer 75 and its subsequent reorder buffer entries that precede the reorder buffer entry pointed to by allocation pointer 73.

Referring again to FIG. 4, the entries of reorder buffer 76 are read by completion logic 80 and exception logic 82 of sequencer unit 18. In response to the "exception" fields of reorder buffer 76, exception logic 82 handles exceptions encountered during execution of dispatched instructions. In response to the "finished" fields and "exception" fields of reorder buffer 76, completion logic 80 outputs signals to dispatch logic 74 and to reorder buffer 76. Through these signals, completion logic 80 indicates "completion" of instructions in order of their programmed sequence. Completion logic 80 indicates "completion" of an instruction if it satisfies the following conditions:

Condition 1—The execution unit (to which the instruction is dispatched) finishes execution of the instruction (such that "finished"=1 in the instruction's associated entry in reorder buffer 76);

Condition 2—No exceptions were encountered in connection with any stage of processing the instruction (such that "exception"=0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

Reorder buffer 76 inputs a CORRECTION signal and a BRANCH_ROBTAG signal from branch unit 20. The CORRECTION signal is discussed further hereinbelow in connection with FIG. 8. The BRANCH_ROBTAG signal is discussed further hereinbelow in connection with FIGS. 8 and 10. Further, reorder buffer 76 outputs a DISPATCH_ROBTAG signal to execution units 20, 22, 24, 26, 28 and 30. The DISPATCH_ROBTAG signal is discussed further hereinbelow in connection with FIGS. 7, 8 and 10.

In response to dispatching any type of branch instruction (conditional or otherwise), dispatch logic 74 outputs a DISPATCHED_A_BRANCH signal, which is input by basic block control logic 84. Moreover, basic block control logic 84 inputs the CORRECTION signal and a BRANCH_BBID signal from branch unit 20. The BRANCH_BBID signal is discussed further hereinbelow in connection with FIGS. 8 and 10. As shown in FIG. 4, basic block control logic 84 outputs a DISPATCH_BBID signal and a CANCEL_BBID signal to execution units 20, 22, 24, 26, 28 and 30.

Figure 6:
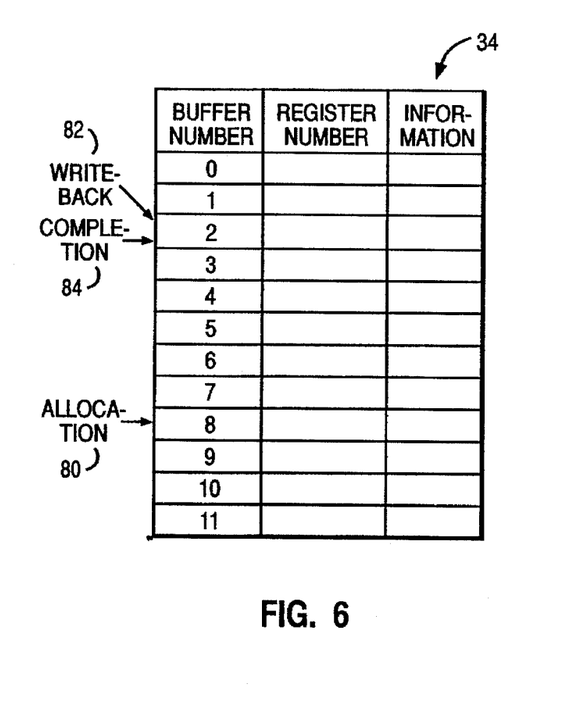
FIG. 6 is a conceptual illustration of rename buffers of the processor of FIG. 1.

FIG. 6 is a conceptual illustration of rename buffers 34. For clarity, the operation is discussed hereinbelow only of fixed point rename buffers 34 as exemplifying the operation of floating point rename buffers 38. As shown in FIG. 6, rename buffers 34 include twelve rename buffers respectively labelled as buffer numbers 0–11. Sequencer unit 18 allocates (or "associates") rename buffer numbers 0–11 to dispatched instructions on a first-in first-out basis and in a rotating manner, such that sequencer unit 18 allocates rename buffer number 0, followed sequentially by rename buffer numbers 1–11, and then rename buffer number 0 again.

Referring to FIG. 6, rename buffers 2, 3, 4, 5, 6 and 7 are allocated to store destination operand information for instructions dispatched by dispatch logic 74 (FIG. 4). FIG. 6 shows an allocation pointer 80, a writeback pointer 82, and a completion pointer Processor 10 maintains such pointers for controlling reading from and writing to rename buffers 34. Processor 10 maintains allocation pointer 80 to indicate whether a rename buffer is allocated to a particular instruction. As shown in FIG. 6, allocation pointer 80 points to rename buffer 8, thereby indicating that rename buffer 8 is the next rename buffer available for allocation to an instruction.

In a significant aspect of the preferred embodiment, processor 10 further maintains writeback pointer 82 to indicate whether a rename buffer (previously allocated to a particular instruction) is available for reallocation to another instruction. As shown in FIG. 6, writeback pointer 82 points to rename buffer 2, thereby indicating that rename buffer 2 is the next rename buffer from which processor 10 will copy destination operand information (as stored in the rename buffer's "information" field of FIG. 6) to one of GPRs 32 (as specified in the rename buffer's "register number" field of FIG. 6).

Accordingly, processor 10 advances writeback pointer 82 (past a rename buffer previously allocated to a particular instruction) in response to processor 10 copying the result (destination operand information) of the particular instruction from the rename buffer for storage in an architectural register. In this manner, processor 10 reserves an allocated rename buffer to store the result (destination operand information) of the particular instruction until processor 10 copies the result to an architectural register.

Also, processor 10 maintains completion pointer 84 to indicate (for a rename buffer previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 6, completion pointer 84 points to rename buffer 2, thereby indicating that rename buffer 2 is the next rename buffer capable of satisfying Conditions 1, 2 and 3. In a significant aspect of the preferred embodiment, processor 10 maintains completion pointer 84 independent of whether the instruction's result is copied from the rename buffer for storage in an architectural register.

Accordingly, "rename entries" can be defined as the rename buffer pointed to by completion pointer 84 and its subsequent rename buffers that precede the rename buffer pointed to by allocation pointer 80. "Writeback entries" can be defined as the rename buffer pointed to by writeback pointer 82 and its subsequent rename buffers that precede the rename buffer pointed to by completion pointer 84. The writeback entries store results of instructions that are "complete" but whose results have not been copied from the rename buffers to architectural registers, as for example due to unavailability of write ports to the architectural registers.

Conceptually, the writeback entries are located between the rename entries and the architectural registers. Advantageously, a result may bypass the writeback entries and be written directly into the architectural registers if a writeback port is available at the completion stage. Moreover, like the rename entries, processor 10 operates the writeback entries to output information to an execution unit in situations where the execution unit executes an instruction specifying an architectural register associated with such information.

Figure 7:
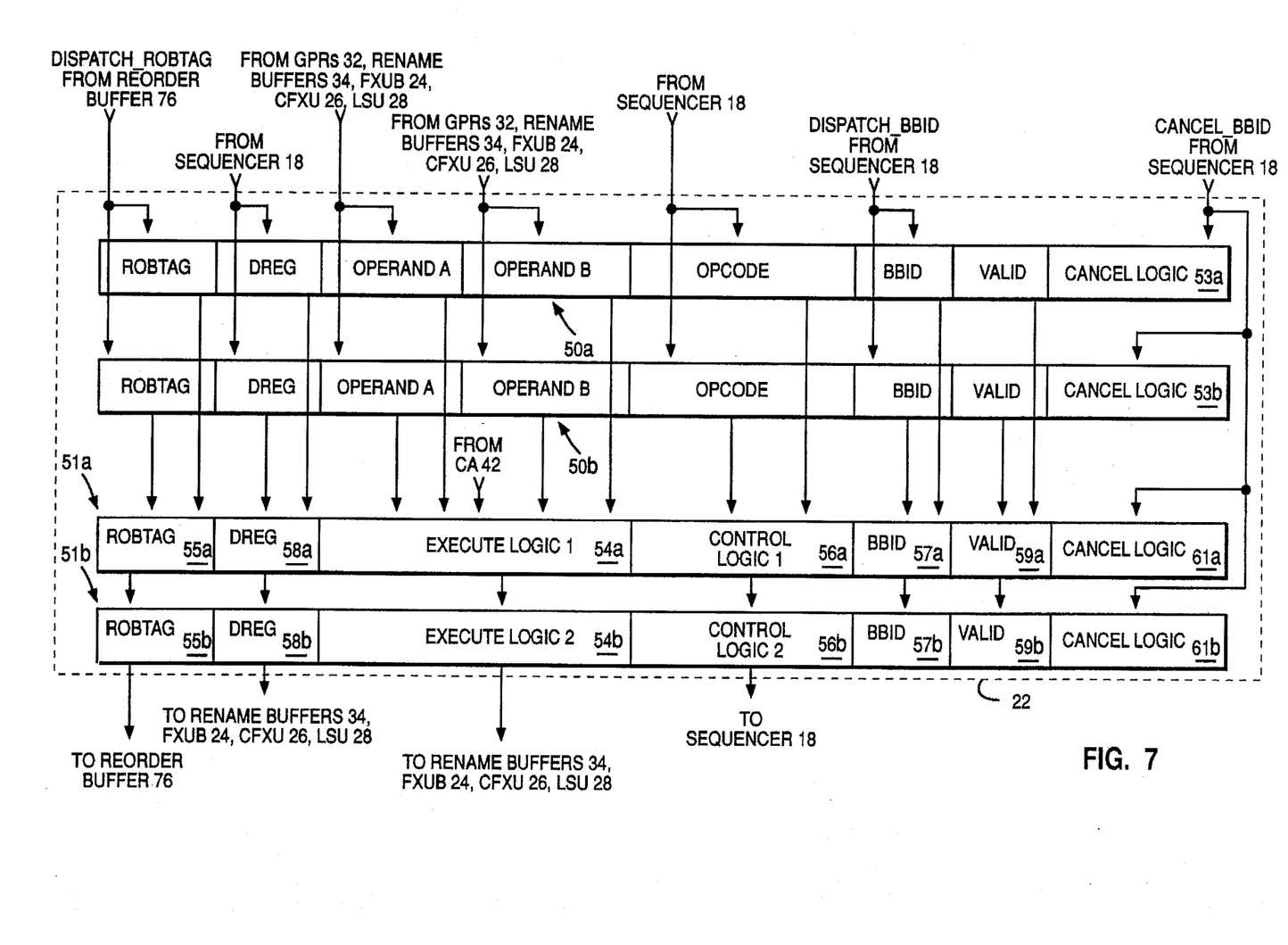
FIG. 7 is a block diagram of a fixed point execution unit of the processor of FIG. 1.

FIG. 7 is a block diagram of FXUA 22 of processor 10. FXUA 22 includes reservation stations indicated generally at 50a and 50b. Moreover, FXUA 22 includes execute stages indicated generally at 51a and 51b. Likewise, each of branch unit 20, FXUB 24, CFXU 26, LSU 28, and FPU 30 has respective reservation stations and execute stages. For clarity, the operation is discussed hereinbelow only of FXUA 22 and its execute stages and reservation stations as exemplifying the operation of other execution units and their respective execute stages and reservation stations.

Each of reservation stations 50a–b is able to store information for a respective instruction dispatched from sequencer unit 18 for execution by FXUA 22. Each of reservation stations 50a–b includes a respective reorder buffer tag ("ROBTAG") field, destination register ("DREG") field, operand A field, operand B field, opcode field, BBID field, and VALID field. Moreover, in a significant aspect of the preferred embodiment, reservation stations 50a and 50b further include cancel logic 53a and 53b, respectively.

In its ROBTAG field, a reservation station stores an indication of the reorder buffer entry allocated to the reservation station's respective instruction, as indicated by the DISPATCH_ROBTAG signal (from reorder buffer 76) at the moment when the reservation station's respective instruction is dispatched by sequencer unit 18.

In its DREG field, a reservation station identifies at least one destination register (as specified by sequencer unit 18) for the reservation station's respective instruction. Similarly, in its respective operand A and operand B fields, a reservation station stores source operand information (from GPRs 32, rename buffers 34, FXUB 24, CFXU 26 or LSU 28) for the reservation station's respective instruction. In its opcode field, a reservation station stores an opcode (as specified by sequencer unit 18) indicating the operation to be executed by FXUA 22 on the source operand information in response to the reservation station's respective instruction.

In its BBID field, a reservation station stores the BBID of its respective instruction as indicated by the DISPATCH_BBID signal (from basic block control logic 84) at the moment when the reservation station's respective instruction is dispatched by sequencer unit 18.

Referring to FIG. 7, a reservation station temporarily stores information for a respective instruction whose source operand information is not available at the time the instruction is dispatched from sequencer unit 18. In response to source operand information becoming available from an execution unit, the reservation station inputs and stores such source operand information. At a suitable moment, the reservation station forwards such source operand information to execute logic 54a.

In response to signals from control logic 56a, execute logic 54a inputs the source operand information from a reservation station's operand A and operand B fields and executes a first stage of an operation (indicated by the reservation station's stored opcode) thereupon. Moreover, in response to the signals from control logic 56a, execute stage 51a inputs (1) the ROBTAG information from the reservation station's ROBTAG field for storage in ROBTAG field 55a, (2) the DREG information from the reservation station's DREG field for storage in DREG field 58a, and (3) the BBID information from the reservation station's BBID field for storage in BBID field 57a.

In response to signals from control logic 56b, execute logic 54b inputs information from execute logic 54a and executes a second stage of the operation thereupon. Moreover, in response to the signals from control logic 56b, execute stage 51b inputs (1) the ROBTAG information from ROBTAG field 55a for storage in ROBTAG field 55b, (2) the DREG information from DREG field 58a for storage in DREG field 58b, and (3) the BBID information from BBID field 57a for storage in BBID field 57b. Like the reservation stations, execute stages 51a–b includes VALID fields 59a–b and cancel logic 61a–b, respectively.

Information resulting from such an operation is output from execute logic 54b to rename buffers 34, FXUB 24, CFXU 26 and LSU 28. Such information is stored in a selected one of rename buffers 34. In response to a destination register identified by the output of DREG 58b, the stored information is associated (within the selected rename buffer) with one of GPRs 32. Moreover, as discussed further hereinabove in connection with FIG. 5, FXUA 22 updates the reorder buffer entry identified by the output of ROBTAG 55b, which is the reorder buffer entry allocated to the instruction executed by execute logic 54b.

In response to sequencer unit 18 dispatching an instruction to a reservation station, the reservation station's VALID field is set to a logical 1. In response to execute stage 51a finishing execution of the instruction, VALID field 59a is cleared to a logical 0. Likewise, in response to execute stage 51b finishing execution of the instruction, VALID field 59b is cleared to a logical 0.

In a significant aspect of the preferred embodiment, cancel logic 53a–b and 61a–b input a CANCEL_BBID signal from sequencer unit 18. Through the CANCEL_BBID signal, sequencer unit 18 is able to indicate one or more BBIDs which are to be cancelled by processor 10. In response to the CANCEL_BBID signal, cancel logic 53a compares the to-be-cancelled BBIDs with the BBID stored in reservation station 50a. If a to-be-cancelled BBID matches the BBID stored in reservation station 50a, then cancel logic 53a clears the VALID field of reservation station 50a to a logical 0, thereby cancelling execution of that reservation station's respective instruction.

Likewise, if a to-be-cancelled BBID matches the BBID stored in reservation station 50b, then cancel logic 53b clears the VALID field of reservation station 50b to a logical 0, thereby cancelling execution of that reservation station's respective instruction. Similarly, if a to-be-cancelled BBID matches the BBID stored in field 57a of execute stage 51a, then cancel logic 61a clears VALID field 59a to a logical 0, thereby cancelling execution of the instruction in execute stage 51a. Also, if a to-be-cancelled BBID matches the BBID stored in field 57b of execute stage 51b, then cancel logic 61b clears VALID field 59b to a logical 0, thereby cancelling execution of the instruction in execute stage 51b.

Accordingly, processor 10 is able to selectively cancel execution of instructions assigned to a particular BBID. This is true even if the instructions are dispatched to one or more execution units. Moreover, each execution unit is able to selectively cancel such instructions in the execution unit's reservation stations and execute stages independent of one another, according to each instruction's respective assigned BBID.

Figure 8:
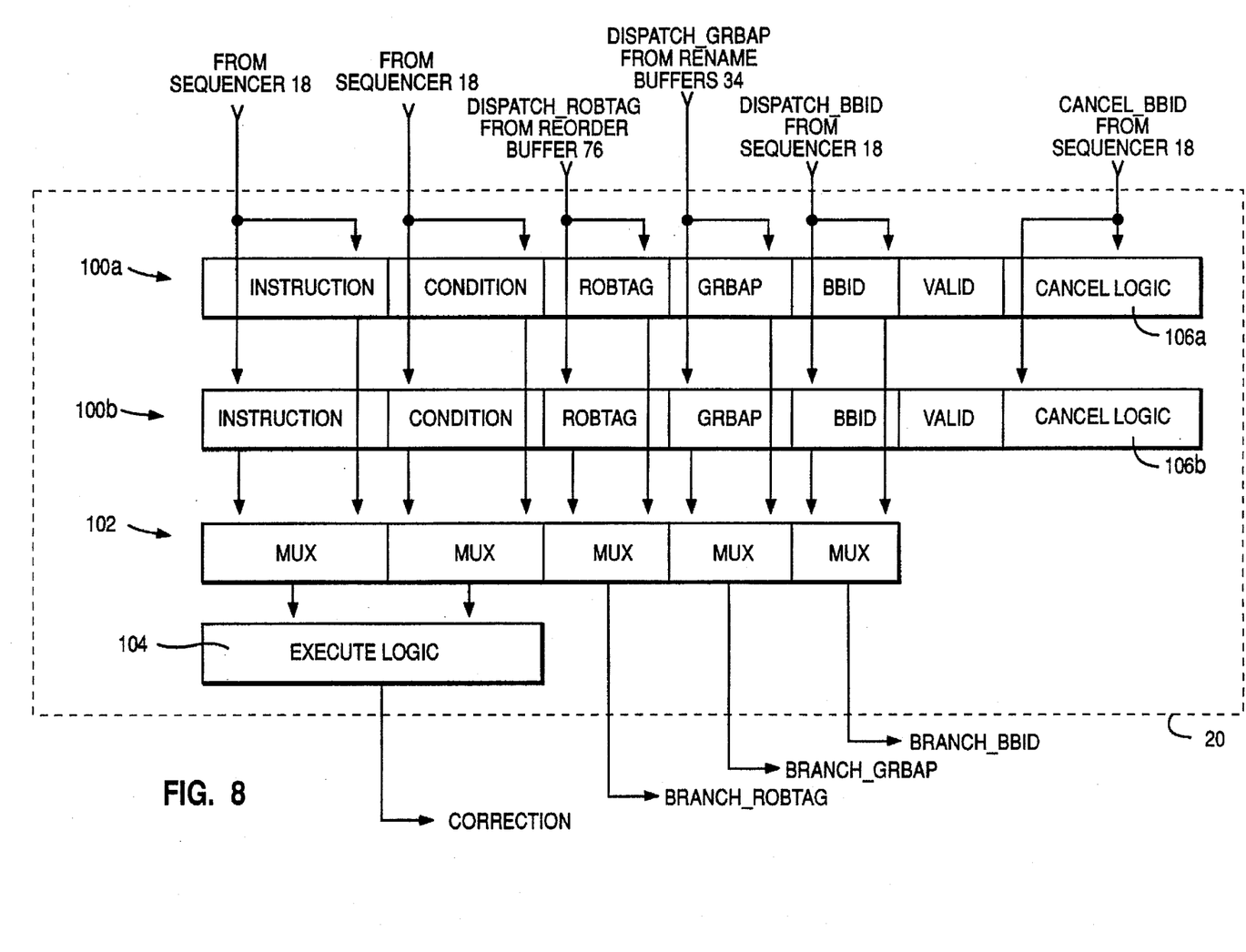
FIG. 8 is a block diagram of a branch unit of the processor of FIG. 1.

FIG. 8 is a block diagram of branch unit 20. Branch unit 20 includes reservation stations indicated generally at 100a and 100b. Moreover, branch unit 20 includes multiplexers indicated generally at 102. Also, branch unit 20 includes execute logic 104.

Each of reservation stations 100a–b includes a respective INSTRUCTION field, CONDITION field, ROBTAG field, GPR rename buffer allocation pointer ("GRBAP") field, BBID field, and VALID field. Moreover, in a significant aspect of the preferred embodiment, reservation stations 100a and 100b further include cancel logic 106a and 106b, respectively.

In its INSTRUCTION field, a reservation station stores a code (as specified by sequencer unit 18) indicating the type of branch instruction to be executed by branch unit 20.

In its ROBTAG field, a reservation station stores an indication of the reorder buffer entry allocated to the reservation station's respective instruction, as indicated by the DISPATCH_ROBTAG signal (from reorder buffer 76) at the moment when the reservation station's respective instruction is dispatched by sequencer unit 18. In its GRBAP field, a reservation station stores an indication of the status of allocation pointer 80 (FIG. 6), as indicated by the DISPATCH_GRBAP signal (from rename buffers 34) at the moment when the reservation station's respective instruction is dispatched by sequencer unit 18. In its BBID field, a reservation station stores the BBID of its respective instruction as indicated by the DISPATCH_BBID signal (from basic block control logic 84) at the moment when the reservation station's respective instruction is dispatched by sequencer unit 18.

Referring to FIG. 8, a reservation station temporarily stores information for a respective branch instruction whose branch condition information (i.e. the actual state of the instruction's branch condition) may not be available at the time the branch instruction is dispatched from sequencer unit 18. In response to branch condition information becoming available from execution units 22, 24, 26, 28 and 30 (via sequencer unit 18), the reservation station inputs and stores such branch condition information in its CONDITION field. At a suitable moment, the reservation station forwards such branch condition information from its CONDITION field (together with the code from its INSTRUCTION field) to execute logic 104 through multiplexers 102.

In response to the branch condition information and the code input from a particular reservation station, execute logic 104 determines whether the actual state of the particular reservation station's respective branch condition is different from the predicted state. In response to the predicted state being wrong, execute logic 104 outputs a CORRECTION signal. Moreover, in response to the predicted state being wrong, multiplexers 102 output (1) as a BRANCH_ROBTAG signal, information from the particular reservation station's respective ROBTAG field, (2) as a BRANCH_GRBAP signal, information from the particular reservation station's respective GRBAP field, and (3) as a BRANCH_BBID, information from the particular reservation station's respective BBID field.

In response to sequencer unit 18 dispatching an instruction to a reservation station, the reservation station's VALID field is set to a logical 1. In a significant aspect of the preferred embodiment, cancel logic 106a–b inputs the CANCEL_BBID signal from sequencer unit 18. In response to the CANCEL_BBID signal, cancel logic 106a compares the to-be-cancelled BBIDs with the BBID stored in reservation station 100a. If a to-be-cancelled BBID matches the BBID stored in reservation station 100a, then cancel logic 106a clears the VALID field of reservation station 100a to a logical 0, thereby cancelling execution of that reservation station's respective instruction. Likewise, if a to-be-cancelled BBID matches the BBID stored in reservation station 100b, then cancel logic 106b clears the VALID field of reservation station 100b to a logical 0, thereby cancelling execution of that reservation station's respective instruction.

Figure 9:
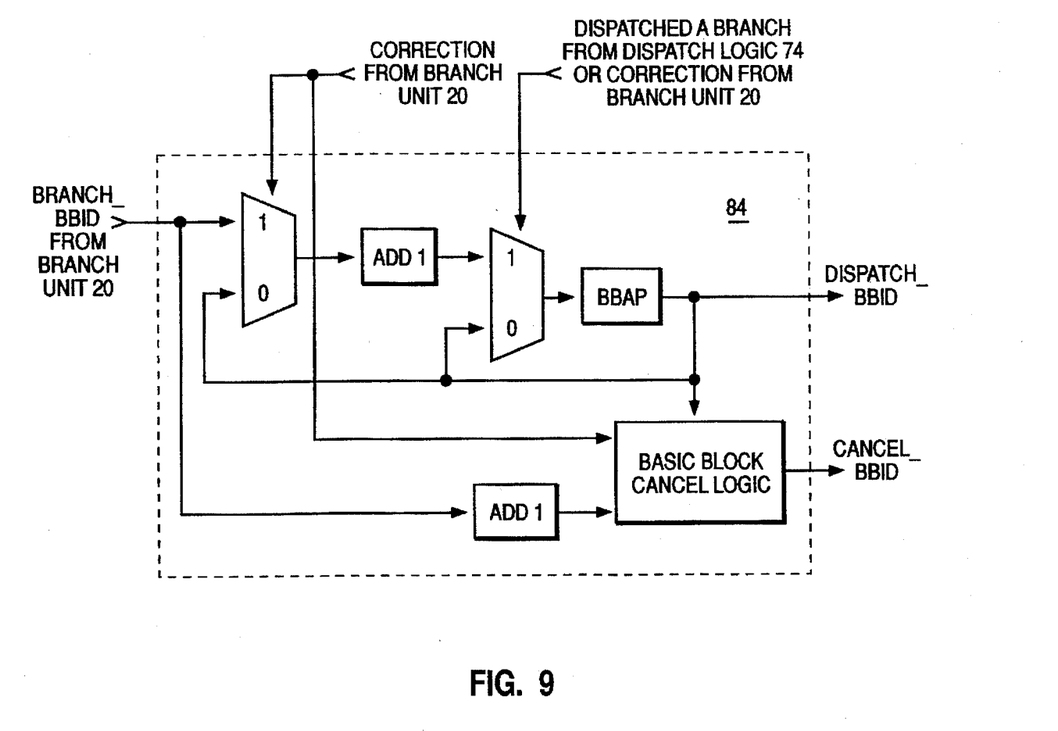
FIG. 9 is a block diagram of basic block control logic of the sequencer unit of FIG. 4.

FIG. 9 is a block diagram of basic block control logic ("BBCL") 84 of sequencer unit 18 (FIG. 4). A basic block allocation pointer ("BBAP") register stores a basic block number and outputs the stored basic block number as the DISPATCH_BBID signal. In response to the DISPATCHED_A_BRANCH signal from dispatch logic 74, BBCL 84 increments the basic block number stored in BBAP. In response to the CORRECTION signal from branch unit 20, BBCL 84 inputs the BRANCH_BBID signal from branch unit 20, increments the basic block number indicated by the BRANCH_BBID signal, and stores this incremented basic block number in BBAP in place of BBAP's previously stored basic block number.

In the preferred embodiment, the basic block number is initially 0, followed sequentially by basic block numbers 1–3, and then basic block number 0 again. Also, in the preferred embodiment, processor 10 is able to dispatch up to four instructions during a single cycle. Notably, if processor 10 dispatches a branch instruction during a particular cycle, then the dispatched branch instruction will be the last instruction dispatched during the particular cycle. Accordingly, for the particular cycle, BBCL 84 does not increment (in response to the DISPATCHED_A_BRANCH signal from dispatch logic 74) the basic block number stored in BBAP until after all instructions are dispatched.

Moreover, in response to the CORRECTION signal from branch unit 20, basic block cancel logic of BBCL 84 outputs the CANCEL_BBID signal. Through the CANCEL_BBID signal, BBCL 84 indicates one or more BBIDs which are to be cancelled by processor 10. Through the CANCEL_BBID signal, the basic block cancel logic indicates the to-be-cancelled BBID's are any BBID's following the basic block number indicated by the BRANCH_BBID signal, up through and including the basic block number indicated by the DISPATCH_BBID signal prior to BBCL 84 receiving the CORRECTION signal from branch unit 20.

In an alternative embodiment, BBCL 84 increments the basic block number stored in BBAP only (1) in response to the actual state of a conditional branch instruction's branch condition indicating that the conditional branch is to be taken or (2) in response to processor 10 predicting a state of a branch condition of the conditional branch instruction. A conditional branch is considered to be taken if, after the conditional branch instruction, the next instruction to be processed by processor 10 does not immediately follow the conditional branch instruction within the programmed sequence of instructions. Accordingly, a branch instruction is a "program flow altering" instruction.

Figure 10:
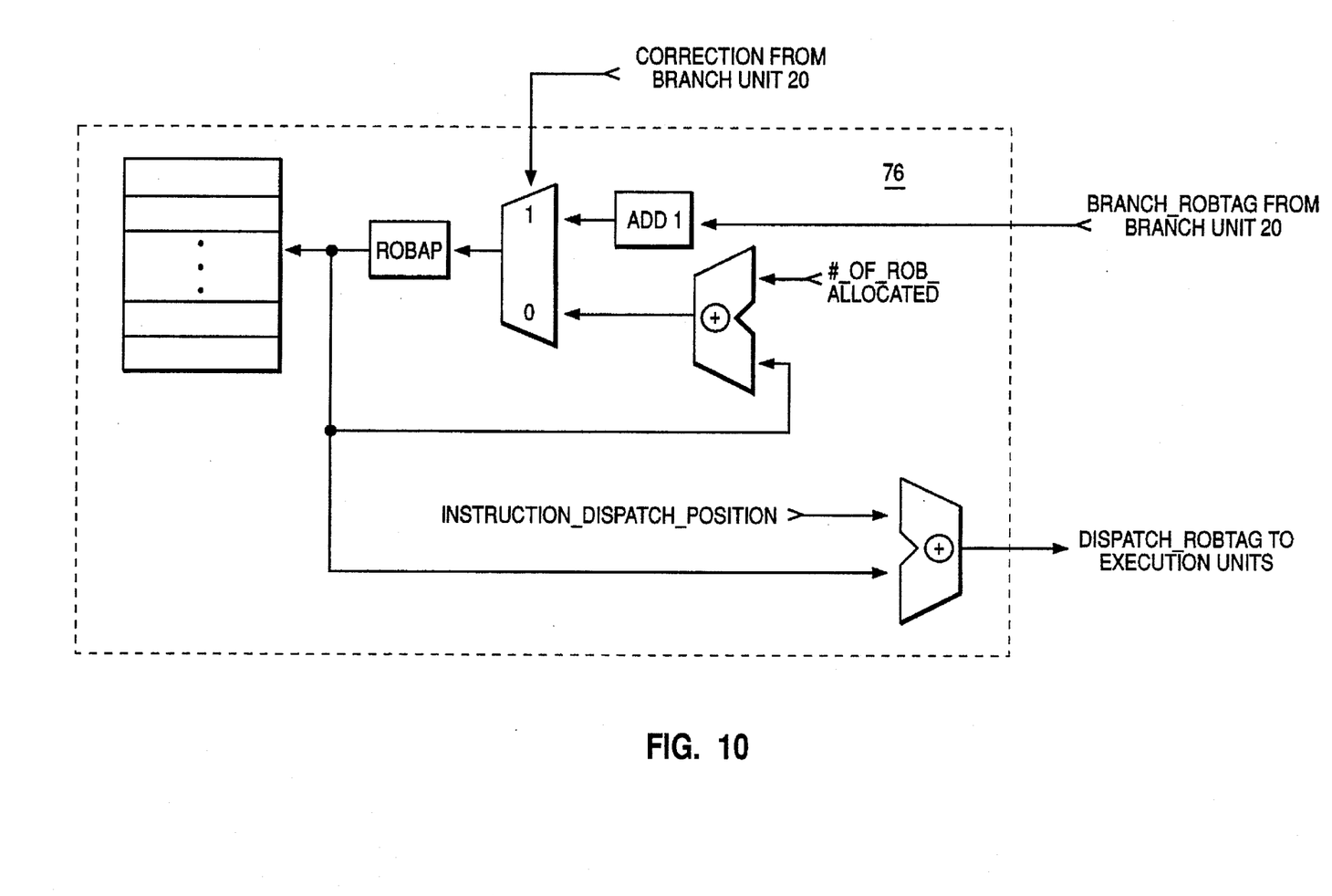
FIG. 10 is a block diagram of a reorder buffer of the sequencer unit of FIG. 4.

FIG. 10 is a block diagram of reorder buffer 76 of sequencer unit 18 (FIG. 4). A reorder buffer allocation pointer ("ROBAP") register stores a reorder buffer entry number pointed to by allocation pointer 73 (FIG. 5).

For a particular instruction dispatched during a particular cycle, a INSTRUCTION_DISPATCH_POSITION signal indicates whether the particular instruction is the first, second, third or fourth instruction dispatched during the particular cycle. For example, if the particular instruction is the first instruction dispatched during the particular cycle, then the INSTRUCTION_DISPATCH_POSITION signal indicates a number 0. Similarly, if the particular instruction is the second instruction dispatched during the particular cycle, then the INSTRUCTION_DISPATCH_POSITION signal indicates a number 1. Also, if the particular instruction is the third instruction dispatched during the particular cycle, then the INSTRUCTION_DISPATCH_POSITION signal indicates a number 2. Finally, if the particular instruction is the fourth instruction dispatched during the particular cycle, then the INSTRUCTION_DISPATCH_POSITION signal indicates a number 3.

For a particular instruction dispatched during a particular cycle, reorder buffer 76 computes a respective entry number by computing the sum of (1) the number indicated by the INSTRUCTION_DISPATCH_POSITION signal and (2) the reorder buffer entry number stored in ROBAP. In the preferred embodiment as indicated further hereinabove in connection with FIG. 5, if the computed sum is less than or equal to the number 15, then the respective entry number equals the computed sum. By comparison, if the computed sum exceeds the number 15, then the respective entry number equals the sum minus 16. For the particular instruction dispatched during the particular cycle, reorder buffer 76 outputs the particular instruction's respective entry number as the DISPATCH_ROBTAG signal.

The #_OF_ROB_ALLOCATED signal indicates the number of reorder buffer entries allocated during a particular cycle of processor 10. Reorder buffer 76 increments the reorder buffer entry number stored in ROBAP by the number indicated by #_OF_ROB_ALLOCATED. At the end of the particular cycle, reorder buffer 76 stores this incremented reorder buffer entry number in ROBAP in place of ROBAP's previously stored reorder buffer entry number.

In response to the CORRECTION signal from branch unit 20, reorder buffer 76 inputs the BRANCH_ROBTAG signal from branch unit 20, increments the reorder buffer entry number indicated by the BRANCH_ROBTAG signal, and stores this incremented reorder buffer entry number as a new reorder buffer entry number in ROBAP in place of ROBAP's previously stored reorder buffer entry number. Accordingly, in a significant aspect of the preferred embodiment, processor 10 processes a correct sequence of instructions in response to determining a branch instruction's branch condition is mispredicted. Significantly, in processing the correct sequence of instructions, processor 10 does not use, read, or rely upon information previously stored in the new reorder buffer entry number. In this manner, processor 10 processes the correct sequence of instructions independent of information previously stored in the new reorder buffer entry number, such that the new reorder buffer entry number is associable with one of the correct sequence of instructions even prior to completion of the branch instruction.

Figure 11:
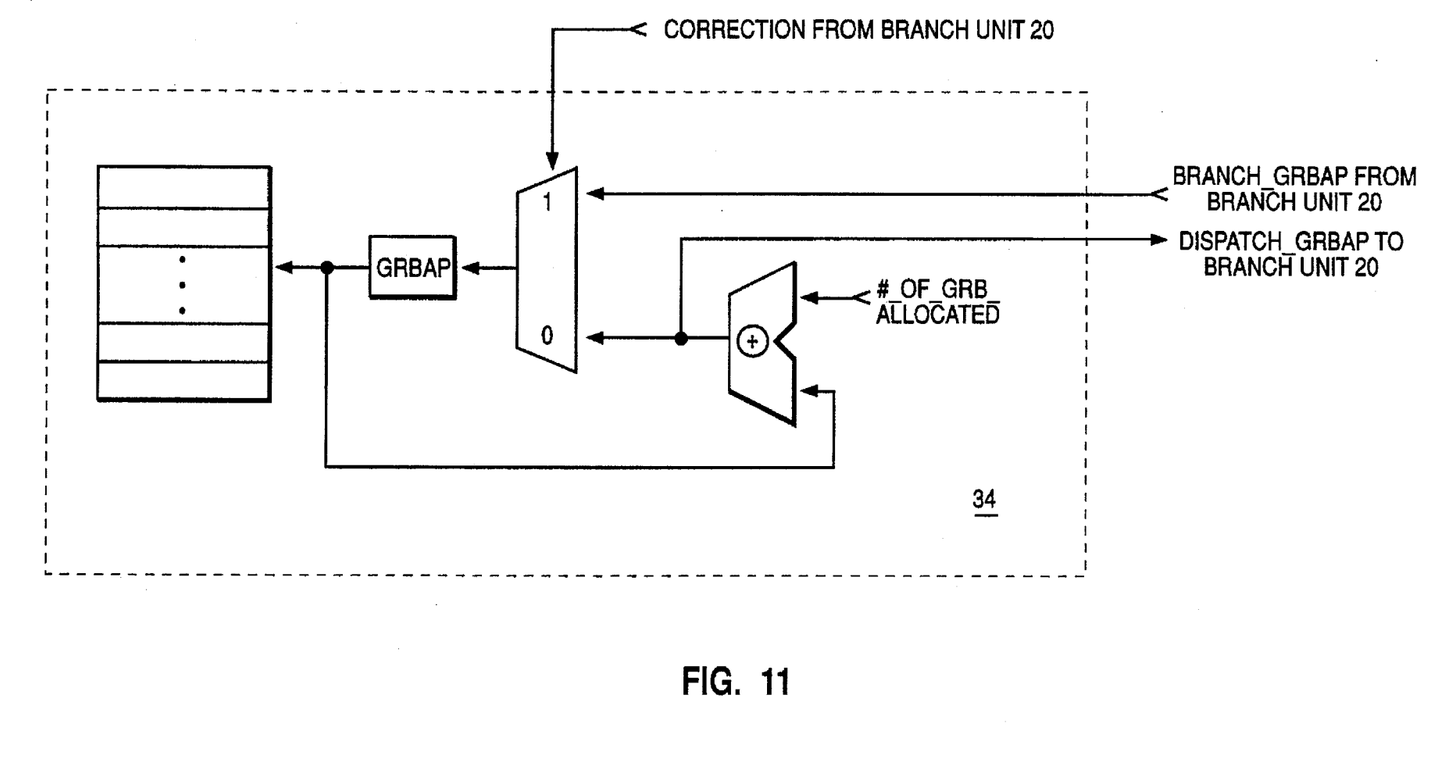
FIG. 11 is a block diagram of rename buffers of the processor of FIG. 1.

FIG. 11 is a block diagram of rename buffers Rename buffers 34 input the CORRECTION signal and the BRANCH_GRBAP signal from branch unit 20. A GPR rename buffer allocation pointer ("GRBAP") register stores a rename buffer number pointed to by allocation pointer 80 (FIG. 6).

The #_OF_GRB_ALLOCATED signal indicates the number of GPR rename buffers allocated during a particular cycle of processor 10. Rename buffers 34 increment the rename buffer number stored in GRBAP by the number indicated by #_OF_GRB_ALLOCATED and output this incremented rename buffer number as the DISPATCH_GRBAP signal. At the end of the particular cycle, rename buffers 34 store this incremented rename buffer number in GRBAP in place of GRBAP's previously stored rename buffer number.

In response to the CORRECTION signal from branch unit 20, rename buffers 34 input the BRANCH_GRBAP signal from branch unit 20, increment the rename buffer number indicated by the BRANCH_GRBAP signal, and store this incremented rename buffer number as a new rename buffer number in GRBAP in place of GRBAP's previously stored rename buffer number. Accordingly, in a significant aspect of the preferred embodiment, processor 10 processes a correct sequence of instructions in response to determining a branch instruction's branch condition is mispredicted. Significantly, in processing the correct sequence of instructions, processor 10 does not use, read, or rely upon information previously stored in the new rename buffer number. In this manner, processor 10 processes the correct sequence of instructions independent of information previously stored in the new rename buffer number, such that the new rename buffer number is associable with one of the correct sequence of instructions even prior to completion of the branch instruction.

FIG. 3 shows the status of ROBAP, GRBAP, BBAP, ROBTAG, GRBAP and BBID during the various cycles of processor 10 for the example of FIGS. 2 and 3. As shown in FIG. 3, branch entry A includes BRN1, and branch entry B includes BRN2 and BRN3. In FIG. 3, if a "-" is shown in a row associated with a particular one of ROBTAG, GRBAP and BBID and in a column associated with a particular cycle of processor 10, then the particular one of ROBTAG, GRBAP and BBID is invalid during the particular cycle.

Notably, if processor 10 cancels all BBID's (such that any instruction assigned to any BBID is cancelled), then all instructions are cancelled, thereby resetting processor 10.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. A method of operating a processing system, comprising the steps of:

in response to a dispatch processing stage of a first branch instruction, processing a first instruction prior to an execution processing stage of said first branch instruction;

in response to said dispatch processing stage of said first branch instruction and to a dispatch processing stage of a second branch instruction, processing a second instruction so that a dispatch processing stage of said second instruction occurs prior to said execution processing stage of said first branch instruction and to an execution processing stage of said second branch instruction; and in response to said execution processing stage of at least one of said first and second branch instructions, cancelling said processing of said second instruction prior to a completion processing stage of said executed branch instruction.

2. The method of claim 1 wherein said step of cancelling comprises the step of cancelling at least one basic block including said second instruction and any later instruction processed prior to said execution processing stage of said executed branch instruction.

3. The method of claim 2 and further comprising the step of forming each said basic block to include any instruction processed in response to said dispatch processing stage of a respective branch instruction and prior to said dispatch processing stage of a next branch instruction.

4. The method of claim 2 and further comprising the step of processing, in response to said execution processing stage of said executed branch instruction and to cancelling said basic block, an additional instruction.

5. The method of claim 4 wherein said step of processing said additional instruction comprises the step of processing said additional instruction prior to said completion processing stage of said executed branch instruction.

6. The method of claim 1 wherein said step of cancelling comprises the step of cancelling said processing of said second instruction prior to completion processing stages of said first and second branch instructions.

7. The method of claim 1 wherein said step of cancelling comprises the step of cancelling, in response to said execution processing stage of said first branch instruction, said processing of said second instruction prior to said completion processing stage of said first branch instruction.

8. The method of claim 7 and further comprising the step of cancelling, in response to said execution processing stage of said first branch instruction, said processing of said first instruction prior to said completion processing stage of said first branch instruction.

9. The method of claim 1 wherein said step of cancelling comprises the step of cancelling, in response to said execution processing stage of said second branch instruction, said processing of said second instruction prior to said completion processing stage of said second branch instruction.

10. The method of claim 1 and further comprising the step of cancelling, in response to said execution processing stage of said second branch instruction, said processing of said second instruction prior to a completion processing stage of said first branch instruction.

11. A processing system, comprising:

processing circuitry for:

in response to a dispatch processing stage of a first branch instruction, processing a first instruction prior to an execution processing stage of said first branch instruction; and in response to said dispatch processing stage of said first branch instruction and to a dispatch processing stage of a second branch instruction, processing a second instruction so that a dispatch processing stage of said second instruction occurs prior to said execution processing stage of said first branch instruction and to an execution processing stage of said second branch instruction; and circuitry coupled to said processing circuitry for cancelling said processing of said second instruction in response to said execution processing stage of at least one of said first and second branch instructions prior to a completion processing stage of said executed branch instruction.

12. The system of claim 11 wherein said cancelling circuitry is operable to cancel at least one basic block including said second instruction and any later instruction processed prior to said execution processing stage of said executed branch instruction.

13. The system of claim 12 and further comprising circuitry for forming each said basic block to include any instruction processed in response to said dispatch processing stage of a respective branch instruction and prior to said dispatch processing stage of a next branch instruction.

14. The system of claim 12 wherein said processing circuitry is operable to process, in response to said execution processing stage of said executed branch instruction and to cancelling said basic block, an additional instruction.

15. The system of claim 14 wherein said processing circuitry is operable to process said additional instruction prior to said completion processing stage of said executed branch instruction.

16. The system of claim 11 wherein said cancelling circuitry is operable to cancel said processing of said second instruction prior to completion processing stages of said first and second branch instructions.

17. The system of claim 11 wherein said cancelling circuitry is operable to cancel, in response to said execution processing stage of said first branch instruction, said processing of said second instruction prior to said completion processing stage of said first branch instruction.

18. The system of claim 17 wherein said cancelling circuitry is operable to cancel, in response to said execution processing stage of said first branch instruction, said processing of said first instruction prior to said completion processing stage of said first branch instruction.

19. The system of claim 11 wherein said cancelling circuitry is operable to cancel, in response to said execution processing stage of said second branch instruction, said processing of said second instruction prior to said completion processing stage of said second branch instruction.

20. The system of claim 11 wherein said cancelling circuitry is operable to cancel, in response to said execution processing stage of said second branch instruction, said processing of said second instruction prior to a completion processing stage of said first branch instruction.

* * * * *